United States Patent [19]
Bergeron et al.

[11] Patent Number: 4,631,746
[45] Date of Patent: Dec. 23, 1986

[54] COMPRESSION AND EXPANSION OF DIGITIZED VOICE SIGNALS

[75] Inventors: Lawrence E. Bergeron, Andover; Daniel F. Daly, Lowell; Elaine C. Grosso, Billerica, all of Mass.

[73] Assignee: Wang Laboratories, Inc., Lowell, Mass.

[21] Appl. No.: 466,250

[22] Filed: Feb. 14, 1983

[51] Int. Cl.$^4$ .............................................. G10L 5/00
[52] U.S. Cl. .................................................... 381/35
[58] Field of Search ................................. 381/21–40; 375/30, 31, 122

[56] References Cited
PUBLICATIONS

D. Malah, "Time–Domain Algorithms etc.", IEEE Transactions on Acoustics, Speech, Apr. 1979, pp. 121–133.

Malah, D., "Combined Time Domain Harmonic Compression and CUSD . . . ", Proc. IEEE ICASSP, Denver, CO, Apr. 1980, pp. 504–507.

Primary Examiner—E. S. Matt Kemeny
Attorney, Agent, or Firm—Michael H. Shanahan

[57] ABSTRACT

Speech signal data compression is improved by a first compression using Time Domain Harmonic Scaling (TDHS), wherein two periods of voiced data are averaged together, followed by a second compression using Continuously Variable Slope Delta Modulation (CVSD). Pitch period detection and sampling-rate conversion are also features of the invention.

34 Claims, 3 Drawing Figures

COMPRESSION AND EXPANSION OF DIGITIZED VOICE SIGNALS

BACKGROUND OF THE INVENTION

This invention generally relates to the digitization of continuously varying signals which are subsequently reconverted to continuously varying signals. More particularly, this invention relates to compression of digitized analog signals and subsequent expansion of the compressed digitized analog signals for reconversion to analog signals.

In the telecommunications field there has been a continuing trend toward the use of digital transmission techniques wherein analog signals, particularly voice signals, are digitized, transmitted and then reconverted to a sufficiently accurate representation of the original voice signal to be delivered at the receiving end of a telecommunications link. Such digitization of voice signals has permitted multiplexing a large number of voice band channels together, and the switching of those multiplexed voice band channels can then be performed economically using digital techniques. Presently, these voice digitization techniques have been applied primarily to long distance transmission wherein transmission costs dominate and significant savings are realized by utilizing digital transmission techniques of digitized voice signals. As the size and cost of microprocessors and memory keep decreasing it is becoming economically feasible to extend these digital techniques for processing analog signals into the terminal equipment at both ends of a telecommunications link. Within ten to fifteen years it is estimated that digital transmission techniques and equipment will completely dominate the telecommunications field from the subscriber terminal equipment through switching equipment to the long distance transmission equipment.

To further extend the usefulness of digital techniques in the telecommunications field much work is being done to reduce the number of bits in the digital signal representing a speech signal without impairing reproduction of the voice signal that the digital signal was originally derived from. This is done by signal processing of the continuously varying voice signals and the digital signals derived therefrom to achieve the bit-rate reductions. Different techniques have been developed for the bit-rate reduction of digitized voice signals which are generally referred to as waveform coding techniques. These waveform coding techniques include adaptive differential pulse code modulation, sub-band coding and transform coding, all of which can typically reduce the bit-rate of a digitized voice signal by more than a factor of two. Another technique used in the Bell System is time assignment speech interpolation (TASI) in which silence intervals within speech are detected and not transmitted. Yet another technique is vocoding in which speech is analyzed to extract its essential parameters followed by synthesis to reconstruct the speech. Presently, vocoder techniques do not offer the naturalness of speaker characteristics and its use is limited to applications where extremely low bit rates are dictated, such as in secure voice transmission.

Speech processing and digitization to reduce the number of binary bits making up the digitized voice signal are also being applied to a relatively new field wherein digitized voice signals are stored and then read out for reconstruction into voice signals at a later time. This is a store-and-forward approach wherein voice messages are digitally stored for later delivery to a receiving party via the telephone, similar to the service provided by electronic mail. Store-and-forward systems have been developed by a number of companies including Wang, IBM, Bell System and VMX, Inc.

In the store-and-forward systems large capacity memories are required and presently relatively expensive disk storage is utilized. Without bit-rate reduction techniques being applied to a digitized voice signal, speech may typically be digitized at 64 kilobits/second and every two minutes worth of digitized speech requires one megabyte of memory space for storage. It can readily be seen that extensive amounts of memory are required for a viable store-and-forward system and there is a need for techniques to reduce the amount of memory required to store a given amount of digitized voice. One approach has been to store only the active speech but this provides only a small amount of signal compression. The previously mentioned adaptive differential pulse code modulation, sub-band coding and transform coding techniques can compress the digitized signals by a factor of two which is a significant savings but there is still a need in the art to further compress digitized voice signals to minimize the amount of memory required to store these signals.

SUMMARY OF THE INVENTION

The above need in the prior art is met by our invention which utilizes prior art bit rate compression techniques to achieve a 4:1 reduction in the binary signals representing a digitized voice signal. The preferred embodiment of our invention utilizes the Time Domain Harmonic Scaling technique (TDHS) which is used by itself in the prior art to achieve a 2:1 reduction of the binary data representing a digitized voice signal. In addition, we utilize the Continuously Variable Slope Delta modulation technique (CVSD), which is also normally used by itself to achieve bit rate reductions. TDHS processing comprises Time Domain Harmonic Compression (TDHC) processing for data compression and Time Domain Harmonic Expansion (TDHE) processing for data expansion. In addition, a known technique of converting an eight bit output from a non-linear analog to digital converter to a twelve bit number which linearizes the output from the analog to digital converter is also used. Further, a linear interpolation upsampling technique is utilized to increase the data sampling rate required for operation of Continuously Variable Slope Delta modulation.

Initially a voice, audio or other analog signal that continuously varies is sampled eight thousand times per second and each sample is linearly converted to a binary number. This is accomplished by first passing the voice signal through a conventional analog-to-digital converter which provides an eight bit binary number output in u-255 LAW PCM form for each sample. The analog-to-digital converter inherently is non-linear in nature so the digitized voice signal output therefrom is processed further utilizing a first microprocessor to remove the effects of the non-linear conversion by the analog-to-digital converter. This linearization of the digitized voice converts each eight bit binary number to a twelve bit binary number of a first number of these twelve bit binary numbers, representing digitized samples of the audio signal, are collected in a first buffer memory. This is done in real time. When the first buffer memory has a predetermined number of binary numbers stored therein, representing a given time segment of speech, the binary words are transferred to a second buffer memory associated with a second high speed processor. This second processor implements the pitch detection of the TDHC technique, which uses autocorrelation to extract the pitch value of the voice signal being input to our novel apparatus. In addition, using triangular weighting, TDHC accomplishes a bit rate reduction with the first number of binary numbers representing the sampled voice signal being halved. This is a 2:1 bit rate reduction yielding four thousand samples per second. Further in the signal processing CVSD processing is performed which normally requires a sampling rate input of at least thirty-two thousand samples per second in order to function properly. The output from the TDHC processing does not provide a high enough sample rate input for the proper operation of the CVSD processing. We therefore upsample the output of the TDHC processing by a factor of four to effectively provide an output of sixteen thousand samples per second. This is accomplished using an interpolation technique, well known in the art, to generate binary numbers between the binary numbers output from the TDHC processing. The result of the upsampling is sixteen thousand binary number samples per second, but due to the audio spectrum being compressed by a 2:1 factor by the TDHC processing, the CVSD processing operates as if it has a digitized audio signal at the rate of thirty-two thousand samples per second applied thereto. The CVSD processing provides one output bit for every binary word input thereto. The individual bits output from the CVSD processing are assembled into binary words by a serial/parallel converter. When a complete binary word has been assembled in the serial/parallel converter it is transferred out of the converter to a bulk memory. In this manner, each of the twelve bit binary numbers stored in the first buffer memory is converted to a binary bit in one of the binary numbers placed in the bulk memory. Also stored in the bulk memory with the binary numbers assembled in the converter is the value of the pitch period in binary number form, as determined during TDHC processing. Due to the operation of our invention, we achieve a 4:1 bit rate reduction of the original digitized voice signal. Thus less memory is required to store the digitized and compressed voice signals than heretofore possible in the prior art.

To expand our digitized and compressed version of a voice signal the contents of the bulk memory are read out one word at a time and input to the first buffer memory via a DMA interface under control of the first miroprocessor. The data is then moved from the first buffer memory to the aforementioned serial/parallel converter which is now operated to provide parallel to serial conversion. The CVSD processing is now operated in an inverse mode, as is well known in the art, and takes each bit of the binary words output from the parallel to serial conversion and reconverts them to a binary number. The binary numbers output from the inverse CVSD processing are now downsampled to removed the interspersed binary numbers created by interpolation during upsampling. The binary numbers remaining after the 4:1 downsampling now undergo the Time Domain Harmonic Expansion (TDHE) processing. The TDHE processing utilizes the digitized value of pitch which has also been read out from the bulk memory and along with the downsampled binary signals recreates the linearized first number of binary words representing the voice signal which were originally processed by TDHC processing. The binary words generated by the TDHE processing are the delinearized back to u-255 LAW PCM in the second processor before being applied to the converter which is now operating in a digital-to-analog mode. The output of the converter is an accurate representation of the voice signal initially digitized, compressed and stored utilizing the teaching of our invention.

Another feature of our invention is the ability to provide speed control when digitized and compressed voice signals are being reconverted to voice signals. When it is desired to double the playback speed the binary words resulting from the downsampling do not undergo TDHE processing to double the number of binary words, but rather are delinearized and sent directly to the digital-to-analog converter to be reconverted to a voice signal. When it is desired to slow the playback speed, TDHE processing is done a little different than when playing speech back at normal speed.

DESCRIPTION OF THE DRAWING

Our invention will be better understood upon reading the following Detailed Description in conjunction with the drawing in which.

DETAILED DESCRIPTION

Figure 1:
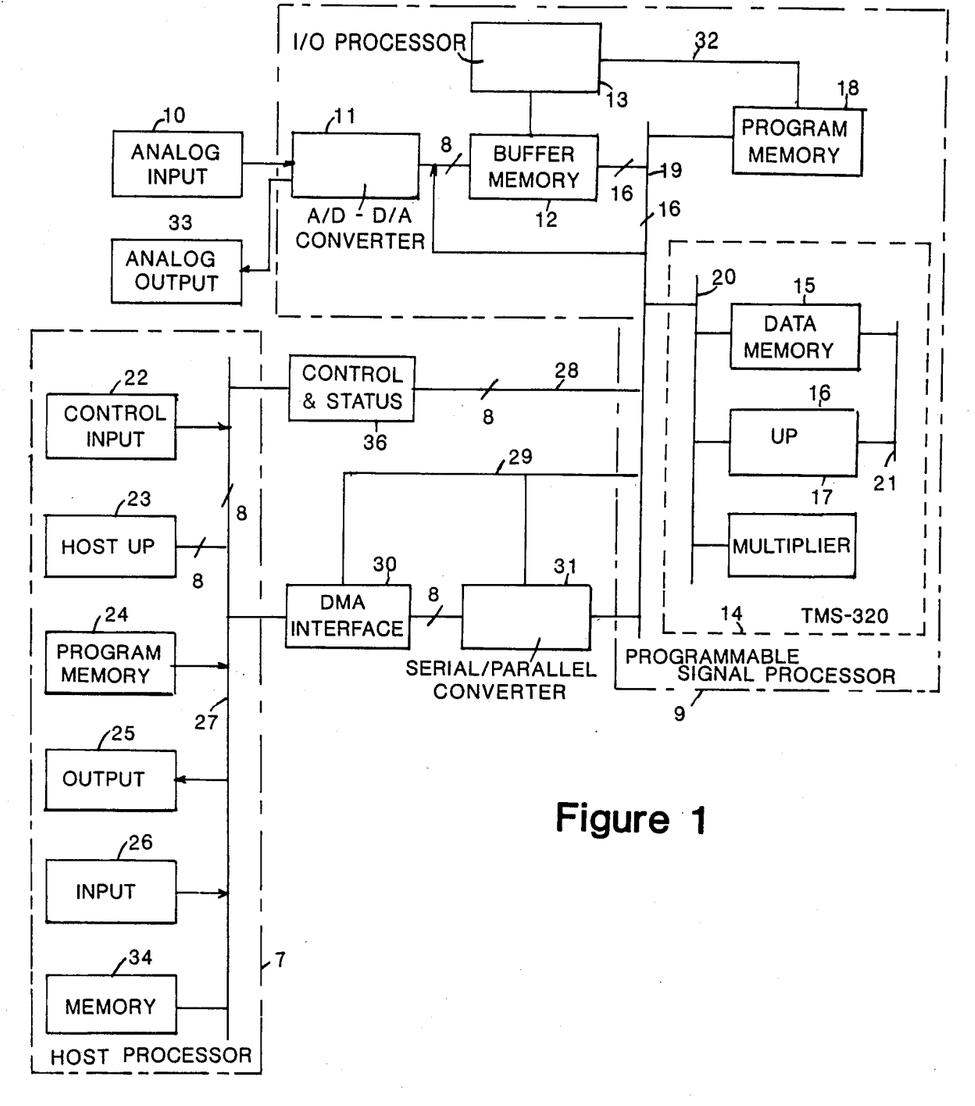
FIG. 1 is a detailed block diagram of the hardware elements implementing our invention.

In FIG. 1 is shown the block diagram of the preferred embodiment of our invention which generally comprising a programmable signal processor 9 functioning with a host processor 7 which controls the storage or transmission of digitized and compressed voice output from processor 9. Host processor 7 can be any common processor configuration herein comprises control input 22, host microprocessor 23, program memory 24, output channel 25, input channel 26, and storage memory 34 which are all interconnected by and function over an eight bit bus 27. Control input 22 comprises any type of control input to the system, such as keys, switches or a keyboard. These inputs are used to activate processor 9 and to select the playback speed when digital signals are reconverted to voice signals. Program memory 24 contains the program which controls the operation of the host microprocessor 23. Output channel 25 is a path over which voice signals that have been digitized and compressed may be output to external memory devices or to a data communication channel [both not shown]. Similarly, input channel 26 may be used to receive digitized and compressed voice signals from an external memory or from a data communication channel [both not shown] to either be stored in memory 34 or to be converted back to a voice signal by processor 9. Memory 34 is a bulk memory of large capacity used to store the digitized and compressed voice signals generated by processor 9 or received from an external source via input channel 26. Host processor 7 communicates with processor 9 via control and status circuit 36 and the eight wires designated 28 which collectively tie buss 27 of processor 7 to a buss 19 processor 9. DMA interface circuit 30 and serial/parallel converter 31 cooperate and are controlled to transfer digitized and compressed voice signals between host processor 7 and processor 9. The operation of these circuits is described in detail further in this specification. Processor 9 is made up of two basic sections. The first section comprises a converter 11 which can function as either an analog-to-digital converter or a digital-to-analog converter, buffer memory 12 and input/output processor 13. Input/output processor 13 is an Intel 8089 I/O controller which controls circuits 11 and 12 per a program stored in program memory 18 to perform the basic digitization of voice signals input to the voice digitizer from analog input 10. Converter 11 is a National 3054 Codec/Filter Combination Chip. Analog input 10 may be a microphone or any other source of voice or any other continously varying signals. Similarly, input/output processor 13 controls circuits 11 and 12 when the processor 9 is in a playback mode to reconvert the digital signals to voice signals to be applied to analog output circuit 33 which may be a speaker, tape recorder or other device. The other portion of processor 9 is microprocessor 14 which is the Texas Instruments TMS-320 processor. Processor 14 has an internal data memory 15 which serves as a buffer memory which is controlled by microprocessor 16 via bus 21. Multiplier circuit 17 is a 16×16 parallel multiplier with a 32 bit product which performs the basic high speed number crunching required for real time binary number compression. Circuits 15, 16 and 17 in TMS-320 processor 14 communicate via a bus 20. The programs controlling microprocessor 16 and I/O processor 14 are both stored in program memory 18. Processor 14, program memory 18 and the basic digitizing circuits 11, 12 and 13 are all tied to and communicate over a sixteen bit bus 19.

In basic operation a voice signal input via analog input circuit 10 is sampled and converted to a multiplicity of digital words in a manner knwon in the art by circuits 11, 12 and 13 whose operation is described in greater detail hereinafter. These digitized voice signals are then forwarded to processor 14 via bus 19. Processor 14 signal processes the digitized voice signals to achieve the 4:1 data compression that is achieved using the teaching of our invention. The digitized and compressed voice signals output from processor 14 are output one bit at a time and are assembled into eight bit binary words by a serial-to-parallel converter 31. When serial-to-parallel converter 31 is full its contents are shifted in parallel format via DMA interface circuit 30 and host processor bus 27 to either bulk memory 34 or via output 25 to either an external memory or to a data communications link. In playback mode digitized and compressed voice signals are obtained from memory 34 or are input from an external source via input 26 and are interimly stored in buffer memory 12, then forwarded to converter 31 which is now operated as a parallel-to-serial converter to feed the data bit by bit via bus 19 to processor 14. Processor 14 processes the bit information input thereto in playback mode to decompress the data, then delinearizes this data to u-255 LAW PCM form, and finally fowards the delinearized data directly to circuit 11 which now operates as a ditial-to-analog converter which converts the binary words to a voice signal applied to analog output 33. All these circuits just briefly outlined hereinabove operate in real time and digitize and compress voice as it is input to programmable signal processor 9 via analog input 10. As previously mentioned, in playback mode an operator applying an instruction via control input 22 may effect the operation of microprocessor 14 such that a voice signal output at analog output 33 may be speeded up or slowed down but with the same voice pitch.

With this basic understanding of the operation of host processor 7 and processor 9 I now describe the circuits shown in FIG. 1 in greater detail.

A voice signal input to processor 9 via analog input 10 is applied to the National converter identified above that can either function as an analog-to-digital converter or a digital-to-analog converter. It would be obvious to one skilled in the art that two separate converter circuits may be also utilized for these functions. In the preferred embodiment of the invention converter 11 digitizes voice signals by sampling a voice signal and digitizing the results in eight bit form at a rate of eight thousand times per second. The output from converter 11 is the known u-255 LAW PCM standard. As is also known this output has some inherent inaccuracy due to the non-linear nature of the sampling and digitization process. To overcome this inherent inaccuracy a more expensive twelve bit digitizer may be utilized, but besides being more expensive such a digitizer also requires more space. To save both space and money we have utilized digitizer 11 and then used input/output processor 13 to process each eight bit word output from digitizer 11, in a manner well known in the art, to generate a twelve bit binary word that includes correction for the non-linearity of digitizer 11. This eight bit word to twelve bit word conversion is accomplished using a look up table in a manner well known in the art.

As each binary word output from digitizer 11 is corrected for non-linearity by processor 13, approximately two hundred such twelve bit words are collected in a first part of buffer memory 12 which can hold a total of two-thousand such words. The actual block size is dependent upon the pitch range of interest and can vary. When first buffer memory 12 has approximately two hundred words stored therein processor 13 causes the words to be forwarded via busses 19 and 20 to be stored in second buffer data memory 15 in TMS-320 processor 14. The next two hundred binary words stored in buffer memory 12 are stored in another portion of the memory so as not to interfere with transfer of the previous two hundred binary words to memory 15 in processor 14.

The two hundred binary words resulting from digitization of the input voice signal that have been transferred to data memory 15 are first signal processed by the Time Domain Harmonic Compression (TDHC). This known technique is not described in great detail herein but is described in detail in the following cited articles which are incroporated by reference herein. These references are:

1. "Time Domain Algorithms for Harmonic Bandwidth Reduction and Time Scaling of Speech Signals", by D. Malah, *IEEE Transactions Acoustics, Speech and Signal Processing,* Volume ASSP-27, No. 2, PP. 121-133, April 1979;
2. "Combined Time Domain Harmonic Compression and CVSD for 7.2 k bit/s Transmission of Speech Signals", by D. Malah, *Proceedings of IEEE ICASSP,* Denver, Colo., 1980, PP. 504-507, April, 1980;
3. "New Approach to Speed Digitization Combining Time Domain Harmonic Scaling Adapative Residual Coding", by J. L. Melsa and A. K. Pande, *Final Report on DCA* 100-80-C-0050, August, 1981; and
4. "On the Use of Autocorrelation Analysis for Pitch Detection", by L. R. Rabiner, *IEEE Transactions on*

*Acoustics, Speech and Signal Processing,* Volume ASSP-25, No. 1, PP. 24-33, Feb. 1977.

This Time Domain Harmonic Compression [THDC] processing technique looks at the digitized voice signals to locate the peak of the auto correlation of the wave forms. From this information the pitch period of the voice is derived and, in addition, two pitch periods digitized voice information are averaged together utilizing a triangular weighting function into a compressed set of data yielding a 2:1 data reduction. In the prior art, this TDHC processing is all the signal processing that would be done to a digitized voice signal to compress the data. However, in accordance with the teaching of our invention we further process the already compressed data to further compress same.

The next major signal processing done on the already 2:1 compressed data is with the known Continuously Variable Slope Delta Modulation processing technique. Normally, for this technique to function properly the sample rate input thereto must be at least thirty-two thousand samples per second. Following the TDHC processing we now only have a sampling rate of four thousand samples per second which is insufficient for proper CVSD processing. To circumvent this problem the partially compressed data obtained utilizing TDHC processing is upsampled by a factor of four utilizing a known interpolation technique to yield a total sample rate of sixteen thousand samples per second. This is normally insufficient for proper CVSD processing but the prior TDHC processing has compressed the frequency spectrum of the digitized voice by a factor of two so the CVSD processing, while only receiving a sample rate of sixteen thousand samples per second, produces the same results as if it is operating with a sample rate of thirty-two thousand samples per second. This CVSD processing is known in the art so is not disclosed in great detail herein but is described in great detail in the following listed references which are incorporated by reference herein. These references are:
1. "Continuous Delta Modulation", J. A. Greefkes, *Phillips Res. Rept.,* No. 23, PP. 233-246, 1968;
2. *"Delta Modulation Systems",* R. Steele, Halsted Press, London, 1975; and
3. *"Specifications Manual for MC3418, Continuously Variable Slope Delta Modulator/Demodulator",* Motorola Semiconductors, Phoenix, Ariz.

The 1:4 upsampling and 4:1 downsampling mentioned hereinafter is not described in detail herein but is described in detail in "A General Program to Perform Sampling Rate Conversion of Data by Rational Ratios", by R. E. Crochiere of Bell Laboratories in Murray Hill, N.J., *Programs For Digital Signal Processing,* IEEE Press, 1979, pages 8.2-1 to 8.2-7.

The CVSD signal processing yields one binary bit output for each binary word input thereto. Thus, for the two hundred binary words stored in data memory 15 for a small segment of speech, a total of two hundred binary bits are output from the CVSD processing. Each of these bits is output via busses 20 and 19 to be temporarily stored in serial-to-parallel converter 31 which assembles the bits into eight bit binary words. Thus, the two hundred bits that are output from the CVSD processing are combined into twenty five eight bit binary words by converter 31. Host microprocessor 23 is informed of the status of processing of the two hundred binary words stored in data memory 15 of processor 14. Host microprocessor 23 causes each eight bit binary word assembled in serial-to-parallel converter 31 to be transferred therefrom via DMA interface circuit 30 to be either stored in bulk memory 34 or to be output via output 25 to an external memory or to a telecommunications channel. In addition, the pitch period determined by the TDHC processing and in binary word form is added with the associated twenty five compressed binary words stored in bulk memory 34.

Upon the two hundred voice samples in binary word form stored in data memory 15 being processed in the manner just described, processor 14 is now ready to receive another two hundred binary words representing digitized voice for further processing. At this time another two hundred voice samples in binary word form has been assembled in buffer memory 12 and these binary words are transferred via busses 19 and 20 to data memory 15 which now processes this new information in the manner just described. Thus, voice digitizer 9 operates in real time to digitize and compress voice signals input via analog input 10.

Figure 2:
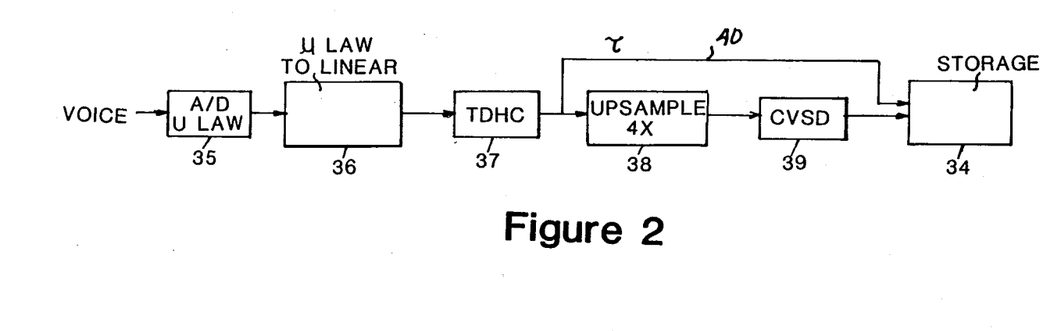
FIG. 2 is a block diagram showing the signal processing steps we apply to digitize and compress voice signals.

FIG. 2 shows the functional steps performed by the hardware shown in FIG. 1 and described hereinabove. A voice signal first undergoes sampling and digitization to the U-255 LAW PCM standard in block 35. Next the digitized signal is linearized as shown at block 36. Then the digitized and linearized voice signal undergoes signal processing to derive the pitch period of the audio signal and to compress the digitized samples by a factor of 2:1 as represented by block 37. Next the partially compressed digital signals output from the TDHC processing are upsampled by a factor of four as represented by block 38. The upsampled digital signals then undergo the CVSD signal processing as represented by block 39. The binary bits output from the CVSD processing are assembled into binary words which in number are compressed by a factor of 4:1 when compared to the original digital signals generated at block 35, and these compressed signals are combined with the value of the pitch period on path 40 to be stored in a storage or memory 34.

Figure 3:
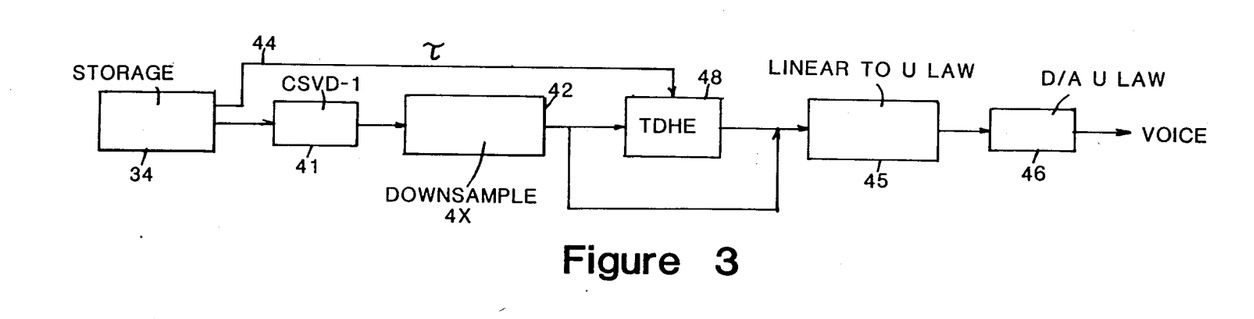
FIG. 3 shows a block diagram showing the signal processing steps for reconverting digitized and compressed voice signals back into the voice signal.

FIG. 3 shows the functional steps performed when a digitized and compressed voice signal, done so in accordance with the teaching of our invention, is read out of memory 34 and is reconverted to an audio signal. The digitized and compressed data read out of storage memory 34 includes the binary number repesenting the pitch period which is used in the TDHE processing represented at block 43. The compressed digitized voice first undergoes inverse CVSD processing to remove the effects of the compression caused by this form of signal processing. This inverse processing is known in the art and is described in the previously cited references. The expanded digitized voice signal output from block 41 is then downsampled by a factor of four at block 42 to remove the binary numbers added to the digitized information by interpolation at block 38 in FIG. 2. The value of pitch period on path 44 and the downsampled digitized voice signals then undergo TDHE processing at block 43 to derive the original binary signals created by digitizing the voice signal. When the operator of our novel equipment decides to change the playback speed they apply an input to the equipment to do so. When it is desired to double the speed of playback the downsampled digitized signals output from block 42 bypass block 43 and do not undergo TDHE processing, but rather go directly to the digital to analog conversion step. When it is desired to slow the playback speed the downsampled digitized signals undergo modified processing to expand the number of binary words. Processor 14 is then utilized to remove the effects of linearization. Finally, the signal output from block 45 is in U-255 LAW PCM format which is converted from digital form to a voice at block 46. This playback operation briefly described by functions referenced to in FIG. 3 is now described in more detail with reference to FIG. 1.

In the playback mode digitized and compress voice signals, done so in accordance with the teaching of our invention, are either read out of memory 34 in processor 7 or are obtained from an external memory or telecommunications channel [both not shown] via input 26. The binary words making up these digitized and compressed signals are individually passed via bus 27 of host processor 7, DMA interface 30, and buss 19 to first buffer memory 12 from which the words are forwarded to processor 14 for expansion and delinearization and then forwarded to serial/parallel converter 31 which now functions as a parallel to serial converter. In this manner the individual bits of each compressed data word is taken one at a time and applied to microprocessor 14. Inverse CVSD processing is performed, in a manner known in the art, and the expanded number of binary numbers resulting therefrom are then downsampled to remove three of every four binary words, and more specifically those binary words created during upsampling by interpolation. The binary words output from the downsampling step then either bypass the TDHE processing step or undergo the TDHE processing to double the playback speed, playback at normal speed, or playback at a reduced speed. As the digitized voice signal is decompressed through the steps just described the expanded number of binary words then undergo delinearization to u-255 LAW PCM and is then forwarded directly to D/A converter 11 to reconvert the binary words to the original voice signal at analog output 33. For details of how to implement a twelve bit to eight bit conversion when reconverting compressed digitized voice signals back to voice see "A New Digital Technique For Implementation of any Continuous PCM Companding Law", by M. Villeret, P. A. Deschenes and H. Stephenne of the Electrical Engineering Department of the University of Sherbrooke, Sherbrooke, Quebec, Canada; *Conference Record, 1973 IEEE International Conference on Communications,* Volume 1, pages 11-12 to 11-17.

While what has been described hereinabove is the preferred embodiment of the invention it will be obvious to those skilled in the art that numerous changes may be made without departing from the spirit and scope of the invention. For example, if the analog-to-digital conversion sampling is performed at thirty two thousand samples per second, 1:4 upsampling is not required before CVSD signal processing. In addition, other types of signal processing may be utilized. Instead of TDHS processing another process that derives the pitch of the voice signal and compresses the spectrum while reducing the number of binary words representing the voice signal may be utilized. Similarly, instead of CVSD processing another delta modulation process that encodes binary words reprsenting sample points as a binary bit representing the slope of the voice signal may be used. In addition, other waveform coding techniques may be utilized to encode the binary words. Also, TDHS and/or CVSD or alternative processing may be undergone more than once in compression and expansion. In addition, for playback speed control binary words may be input to the appropriate signal processing step to affect the degree of binary word expansion. Further, one skilled in the art could detect quiet periods or silence and not digitize these, but further compact the speech information. In addition, the backing of our invention may be utilized in modems, dual tone multi frequency generators and receivers, voice synthesis and recognition, and other signal processing applications due to its programmable nature.

What we claim is:

1. A method of compressing a digital input signal representative of a continuously-varying input signal into a digital pitch value and a plurality of associated signal values, said digital input signal including a plurality of binary words, each reprsentative of the amplitude of said continuously-varying input signal sampled at successive intervals of time, including the steps of:

processing a selected plurality of the binary words of said digital input signal to determine the pitch period of said continuously-varying input signal and providing a digital pitch value representative thereof;

performing a time domain harmonic compression on a first plurality of said binary words in response to said pitch value to provide a TDHC output signal representative of the digital input signal but compressed in time by a first predetermined factor, so that said TDHC output signal has a second plurality of binary words equal to said first plurality divided by said first factor;

interpolating, in response to the TDHC output signal, a predetermined number of binary words between each pair of binary words in the TDHC output signal to provide an expanded signal representative of the TDHC output signal but having a plurality of binary words equal to said second plurality multiplied by a second factor;

encoding said expanded signal by means of a delta modulator to provide an encoded output signal wherein each word in the expanded signal is converted into one bit in the encoded output signal representative of the slope of the expanded signal, the encoded output signal providing said signal values.

2. The method of claim 1 wherein the step of encoding includes the step of performing a continuously-variable slope delta modulation to provide said encoded output signal.

3. The method of claim wherein the step of interpolating includes the step of upsampling the TDHC output signal to provide said predetermined number of binary words between each pair of binary words in the TDHC output signal.

4. The method of claim 1 wherein said first factor is two and said second factor is four.

5. The method of claim 4 wherein the rate at which the continuously-varying input signal is sampled is approximately 8 kilohertz.

6. The method of claim 1 wherein the step of processing includes the step of autocorrelating the digital input signal with itself to determine said pitch period.

7. The method of claim 1 further including the step of transmitting as an associated set of values said pitch value and the encoded output signal.

8. The method of claim 1 further including the step of storing as an associated set of values said pitch value and the encoded output signal.

9. The method of claim 1 wherein the pitch value and associated plurality of signal values are uncompressed into a substantial recreation of the digital input signal, including the steps of:

decoding the bits of the signal values by means of a delta demodulator to provide a demodulated output signal including a plurality of binary words;

deleting selected binary words from the demodulated output signal to provide a reduced output signal representative of the demodulator output signal but having a plurality of binary words equal to the number of binary words in the demodulated output signal divided by said second factor;

performing a time domain harmonic expansion on the binary words in said reduced output signal as a function of the associated pitch value to provide a TDHE output signal expanded by said first factor and including a plurality of binary words equal in number to the number of words in said demodulated output signal multiplied by said first factor;

whereby the plurality of binary words in the expanded output signal is a substantial recreation of the binary input signal.

10. The method of claim 9 wherein the step of decoding includes the step of performing a continuously-variable slope delta demodulation to provide said encoding output signal.

11. The method of claim 9 wherein the step of deleting includes the step of upsampling the TDHC output signal to delete said selected binary words between each pair of binary words in the TDHC output signal.

12. The method of claim 9 wherein said first factor is two and said second factor is four.

13. The method of claim 12 wherein the rate at which the continuously-varying input signal is sampled is approxmately 8 kilohertz.

14. The method of claim 9 wherein the step of processing includes the step of autocorrelating the digital input signal with itself to determine said pitch period.

15. The method of claim 9 further including, between said steps of encoding and decoding, the step of transmitting as an associated set of values said pitch value and the encoded output signal.

16. The method of claim 9 further including, between said steps of encoding and decoding, the step of storing as an associated set of values said pitch value and the encoded output signal.

17. Apparatus for compressing a digital input signal, representative of a continuously-varying input signal, into a digital pitch value and a plurality of associated signal values, said digital input signal including a plurality of binary words, each representative of the amplitude of said continuously-varying input signal sampled at successive intervals of time, comprising:

means for processing a selected plurality of the binary words of said digital input signal to determine the pitch period of said continuously-varying input signal and for providing a digital pitch value representative thereof;

means for performing a time domain harmonic compression on a first plurality of said binary words in response to said pitch value to provide a TDHC output signal representative of the digital input signal but compressed in time by a first predetermined factor, so that said TDHC output signal has a second plurality of binary words equal to said first plurality divided by said first factor;

means for interpolating, in response to the TDHC output signal, a predetermined number of binary words between each pair of binary words in the TDHC output signal to provide an expanded signal respresentative of the TDHC output signal but having a plurality of binary words equal to said second plurality multiplied by a second factor;

delta modulator means for encoding said expanded signal to provide an encoded output signal wherein each word in the expanded signal is converted into one bit in the encoded output signal representative of the slope of the expanded signal, the encoded output signal providing said signal values.

18. The apparatus of claim 17 wherein the means for encoding comprises means for performing a continuously-variable slope delta modulation to provide said encoded output signal.

19. The apparatus of claim 17 wherein the means for interpolating comprises means for upsampling the TDHC output signal to provide said predetermined number of binary words between each pair of binary words in the TDHC output signal.

20. The apparatus of claim 17 wherein said first factor is two and said second factor is four.

21. The apparatus of claim 20 wherein the rate at which the continuously-varying input signal is sampled is approximately 8 kilohertz.

22. The apparatus of claim 17 wherein the means for processing comprises means for autocorrelating the digital input signal with itself to determine said pitch period.

23. The apparatus of claim 17 further comprising means for transmitting as an associated set of values said pitch value and the encoded output signal.

24. The apparatus of claim 17 further comprising means for storing as an associated set of values said pitch value and the encoded output signal.

25. The apparatus of claim 17 further including apparatus for uncompressing the pitch value and associated plurality of signal values into a substantial recreation of the digital input signal, and further comprising:

delta demodulator means for decoding the bits of the signal values to provide a demodulated output signal including a plurality of binary words;

means for deleting selected binary words from the demodulated output signal to provide a reduced output signal representative of the demodulator output signal but having a plurality of binary words equal to the number of binary words in the demodulated output signal divided by said second factor; and means for performing a time domain harmonic expansion on the binary words in said reduced output signal as a function of the associated pitch value to provide a TDHE output signal expanded by said first factor and inlcuding a plurality of binary words equal in number to the number of words in said demodulated output signal multiplied by said first factor;

whereby the plurality of binary words in the expanded output signal is a substantial recreation of the digital input signal.

26. The apparatus of claim 25 wherein the means for decoding comprises means for performing a continuously-variable slope delta demodulation to provide said encoded output signal.

27. The apparatus of claim 25 wherein the means for deleting comprises means for upsampling the TDHC output signal to delete said selected binary words between each pair of binary words in the TDHC output signal.

28. The apparatus of claim 25 wherein said first factor is two and said second factor is four.

29. The apparatus of claim 28 wherein the rate at which the continuosuly-varying input signal is sampled is approximately 8 kilohertz.

30. The apparatus of claim 25 wherein the means for processing comprises means for autocorrelating the digital input signal with itself to determine said pitch period.

31. The apparatus of claim 25 further comprising means for transmitting as an associated set of values said pitch value and the encoded output signal.

32. The apparatus of claim 25 further comprising means for storing as an associated set of values said pitch value and the encoded output signal.

33. The apparatus of claim 17 further including apparatus for uncompressing the pitch value and associated plurality of signal values into a recreation of the digital input signal, said recreation having the same pitch as the continuously-varying input signal but selectively speeded up in time in response to a speed control signal, comprising:

delta demodulator means for decoding the bits of the signal values to provide a demodulated output signal including a plurality of binary words;
   means for deleting selected binary words from the demodulated output signal to provide a reduced output signal representative of the demodulator output signal but having a plurality of binary words equal to the number of binary words in the demodulated output signal divided by said second factor;
   means for performing a time domain harmonic expansion on the binary words in said reduced output signal as a function of the associated pitch value to provide a TDHE output signal expanded by said first factor and including a plurality of binary words equal in number to the number fo words in said reduced output signal multiplied by said first factor; and
   means, responsive to the value of the speed control signal for selecting the TDHE output signal in response to a first value of the speed control signal and for selecting the reduced output signal in response to a second value of the speed control signal, the selected signal providing said recreation of the digital input signal;
   whereby the plurality of binary words in said recreation is a substantial recreation of pitch of the continuously-varying input signal but speeded up in time.

34. The method of claim 1 wherein the pitch value and associated plurality of signal values are uncompressed into a recreation of the digital input signal, said recreation having the same pitch as said input signal but selectively speeded up in time in response to a speed control signal, including the steps of:

decoding the bits of the signal values by means of a delta demodulator to provide a demodulated output signal including a plurality of binary words;
   deleting selected binary words from the demodulated output signal to provide a reduced output signal representative of the demodulator output signal but having a plurality of binary words equal to the number of binary words in the demodulated output signal divided by said second factor;
   selectively performing or not performing, in response to the speed control signal, a time domain harmonic expansion on the binary words in said reduced output signal as a function of the associated pitch value to provide, in response to a first value of the speed control signal, a TDHE output signal expanded by said first factor and including a plurality of binary words equal in number to the number of words in said reduced output signal multiplied by said first factor, and wherein the step of time domain harmonic expansion is bypassed in response to a second value of the speed control signal.

* * * * *

UNITED STATES PATENT AND TRADEMARK OFFICE
CERTIFICATE OF CORRECTION

PATENT NO. : 4,631,746

DATED : December 23, 1986

INVENTOR(S) : Lawrence E. Bergeron, Daniel F. Daly, Elaine C. Grosso

It is certified that error appears in the above—identified patent and that said Letters Patent is hereby corrected as shown below:

Col. 11, line 24 change "encoded" to --decoded--;
Col. 11, line 27 change "upsampling" to --downsampling--;
Col. 11, line 27 change "TDHC" to --TDHE--;
Col. 11, line 29 change "TDHC" to --TDHE--;
Col. 12, line 63 change "encoded" to --decoded--;
Col. 12, line 64 change "upsampling" to --downsampling--;
Col. 12, line 65 change "TDHC" to --TDHE--;
Col. 12, line 66 change "TDHC" to --TDHE--;

Signed and Sealed this

Ninth Day of August, 1988

*Attest:*

DONALD J. QUIGG

*Attesting Officer*    *Commissioner of Patents and Trademarks*